United States Patent
Tada et al.

(10) Patent No.: US 10,687,467 B2
(45) Date of Patent: Jun. 23, 2020

(54) GRASS CONTAINER SWING MECHANISM

(71) Applicant: Kubota Corporation, Osaka-shi (JP)

(72) Inventors: Hiroyuki Tada, Sakai (JP); Hironobu Nishihara, Sakai (JP); Taylor Clark, Sakai (JP); Fahmid Sharkar, Sakai (JP); Benjamin A. Morris, Sakai (JP)

(73) Assignee: Kubota Corporation, Osaka (JP)

( * ) Notice: Subject to any disclaimer, the term of this patent is extended or adjusted under 35 U.S.C. 154(b) by 222 days.

(21) Appl. No.: 15/789,058

(22) Filed: Oct. 20, 2017

(65) Prior Publication Data

US 2019/0116732 A1      Apr. 25, 2019

(51) Int. Cl.
*A01D 43/063*          (2006.01)

(52) U.S. Cl.
CPC ....... *A01D 43/0631* (2013.01); *A01D 43/063* (2013.01)

(58) Field of Classification Search
CPC ............ A01D 43/063; A01D 43/06; A01D 43/0631–0638; A01D 34/63–695; A01D 2101/00
See application file for complete search history.

(56) References Cited

U.S. PATENT DOCUMENTS

| | | | |
|---|---|---|---|
| 4,015,406 A * | 4/1977 | Witt ................... | A01D 43/0635 56/202 |
| 6,584,757 B2 | 7/2003 | Komorida et al. | |
| 7,219,489 B2 * | 5/2007 | Tada .................... | A01D 43/063 56/202 |
| 7,905,080 B2 * | 3/2011 | Uemura ............. | A01D 43/0635 56/202 |
| 2004/0088961 A1 * | 5/2004 | Wanie ................ | A01D 43/0635 56/202 |
| 2007/0056259 A1 * | 3/2007 | Uemura ............. | A01D 43/0636 56/202 |
| 2014/0059998 A1 * | 3/2014 | Canonge ............ | A01D 43/0636 56/202 |

FOREIGN PATENT DOCUMENTS

DE          20021721 U1      5/2001

* cited by examiner

*Primary Examiner* — Alicia Torres
*Assistant Examiner* — Adam J Behrens
(74) *Attorney, Agent, or Firm* — The Webb Law Firm

(57) ABSTRACT

A grass mower includes a mower unit (8) provided on the traveling machine body (10), a grass container (4) provided on a rear portion of the traveling machine body (10) for storing cut grass from the mower unit (8), a rod lever unit (6) capable of undergoing displacement between a first operation position and a second operation position, and a swing mechanism (5) for swinging the grass container (4) between a cut grass storage position and a cut grass discharge position by utilizing operational displacement of the rod lever unit (6). The rod lever unit (6) includes a base rod (61) coupled to the swing mechanism (5), a grip rod (62) extending in a direction offset from an extending direction of the base rod (61), and a coupling portion (63) through which the base rod (61) and the grip rod (62) are coupled so as not to be capable of being rotated relative to each other.

10 Claims, 8 Drawing Sheets

GRASS CONTAINER SWING MECHANISM

TECHNICAL FIELD

The present invention relates to a grass mower including a mower unit, a grass container for storing cut grass from the mower unit, and a swing mechanism for swinging the grass container between a cut grass storage position and a cut grass discharge position by utilizing operational displacement of a rod lever unit.

BACKGROUND ART

U.S. Pat. No. 7,219,489 discloses a grass mower including a traveling machine body, a mower unit provided on the traveling machine body, a grass container provided on a rear portion of the traveling machine body for storing cut grass from the mower unit, a rod-shaped handle capable of undergoing displacement between a first operation position and a second operation position, and a swing mechanism for swinging the grass container between a cut grass storage position and a cut grass discharge position by utilizing operational displacement of the handle. The grass container is supported by the machine body so as to be capable of being swung around a supporting shaft. The handle is slidably attached to the upper portion of the grass container. A grass collection handle is used to pull up the grass container, so that the grass container is swung from the cut grass storage position to the cut grass discharge position.

The handle for pulling up the grass container moves on a trajectory within a large range during the swing operation of the grass container, and therefore, as a result of avoiding interference with the handle, the degree of freedom in arranging constituent members of the grass mower such as a ROPS and an engine auxiliary device decreases. This hampers the achievement of a smart design of a grass mower.

SUMMARY OF INVENTION

It is an object of the present invention to provide a grass mower in which operation of an operation lever to swing a grass container from a cut grass storage position to a cut grass discharge position is performed in an appropriate space.

In order to solve the aforementioned problem, a grass mower including a traveling machine body, a driver seat provided on the traveling machine body, a mower unit provided on the traveling machine body, and a grass container provided on a rear portion of the traveling machine body for storing cut grass from the mower unit, is provided with a rod lever unit capable of undergoing displacement between a first operation position and a second operation position and a swing mechanism for swinging the grass container between a cut grass storage position and a cut grass discharge position by utilizing operational displacement of the rod lever unit, and the rod lever unit includes a base rod coupled to the swing mechanism, a grip rod extending in a direction offset from an extending direction of the base rod, and a coupling portion through which the base rod and the grip rod are coupled so as not to be capable of being rotated relative to each other.

With the above-mentioned configuration, the rod lever unit serving as an operation lever is coupled to the grass container via the swing mechanism to be interlocked therewith, and therefore, the rod lever unit can be substantially arranged at any position on the grass container. Furthermore, the rod lever unit is divided, in its extending direction, into the base rod that is coupled to the swing mechanism, and the grip rod that is coupled to the base rod, and therefore, the grip rod to be operated by a driver or the like can be arranged at an appropriate position and in an appropriate orientation regardless of the position and orientation of the swing mechanism.

In one preferred embodiment, the grip rod has a circular cross section, the base rod has a rectangular cross section, and the coupling portion has a geometrical shape that allows the base rod to be inserted into the grip rod. If the base rod and the grip rod have a circular cross section, and their surfaces to be coupled to each other are cylindrical surfaces, for example, the base rod and the grip rod that have been coupled to each other may be separated due to torque generated on their coupled surfaces in the case where the center lines of the grip rod and the base rod in their extending directions are offset from each other. If the base rod and the grip rod have a rectangular cross section, the rectangular cross section of the grip rod deteriorates the grip feeling felt by a driver. Such problems can be easily solved by applying a structure such as that of this embodiment. It should be noted that the base rod may have a pentagonal cross section or a hexagonal cross section other than the rectangular cross section.

In another preferred embodiment, the grass container is supported by a base frame that is attachable to and detachable from the traveling machine body, on a rear side of the base frame. With this configuration, it is not necessary to provide the grass container with a coupling structure that is attachable to and detachable from the grass container and through which the grass container and the traveling machine body are coupled, thus making it possible to simplify the structure of the grass container to be swung.

In yet another preferred embodiment, the swing mechanism includes a swing plate to be swung around a swing axis of the grass container, a sleeve fixed to the swing plate for slidably receiving the base rod, and an engaged portion that is fixed to the swing plate and is engaged with an engaging portion of the grass container due to operational displacement of the rod lever unit. With this configuration, the operation length of the rod lever unit while the grass container is being swung can be set to be an appropriate length. Furthermore, the engaged portion of the swing plate, which is swung by operating the rod lever unit, and the engaging portion of the grass container are engaged with each other only while the grass container is being swung. Therefore, the engaging portion and the engaged portion are separated from each other when cut grass is collected (during usual operation), and thus no load is generated between the engaging portion and the engaged portion.

When the rod lever unit is arranged to be capable of being operated by a driver seated on the driver seat, the workability of discharging grass is improved. Such an arrangement can be easily realized since the rod lever unit is divided into the base rod and the grip rod.

In yet another preferred embodiment, a biasing device such as a gas spring is provided that biases the grass container in a direction toward the cut grass discharge position via the swing plate. One end of the biasing device is attached to not the grass container but the swing plate, and therefore, there is the advantage that the degree of freedom in selecting a position to which the biasing device is attached increases.

DETAILED DESCRIPTION

Hereinafter, an embodiment of a grass mower according to the present invention will be described with reference to the drawings.

This grass mower is a riding-type grass mower including a traveling machine body 10 supported by a pair of left and right front wheels 11 and a pair of left and right rear wheels 12. In this specification, unless otherwise stated, "front" means a front side in the front-rear direction (traveling direction) of the machine body, and "rear" means a rear side in the front-rear direction (traveling direction) of the machine body. A left-right direction or a lateral direction means a transverse direction of the machine body (a width direction of the machine body) that is orthogonal to the front-rear direction of the machine body. "Upper side" or "lower side" refers to a positional relationship in a vertical direction (perpendicular direction) of the machine body, and shows a height relationship above the ground.

Figure 1:
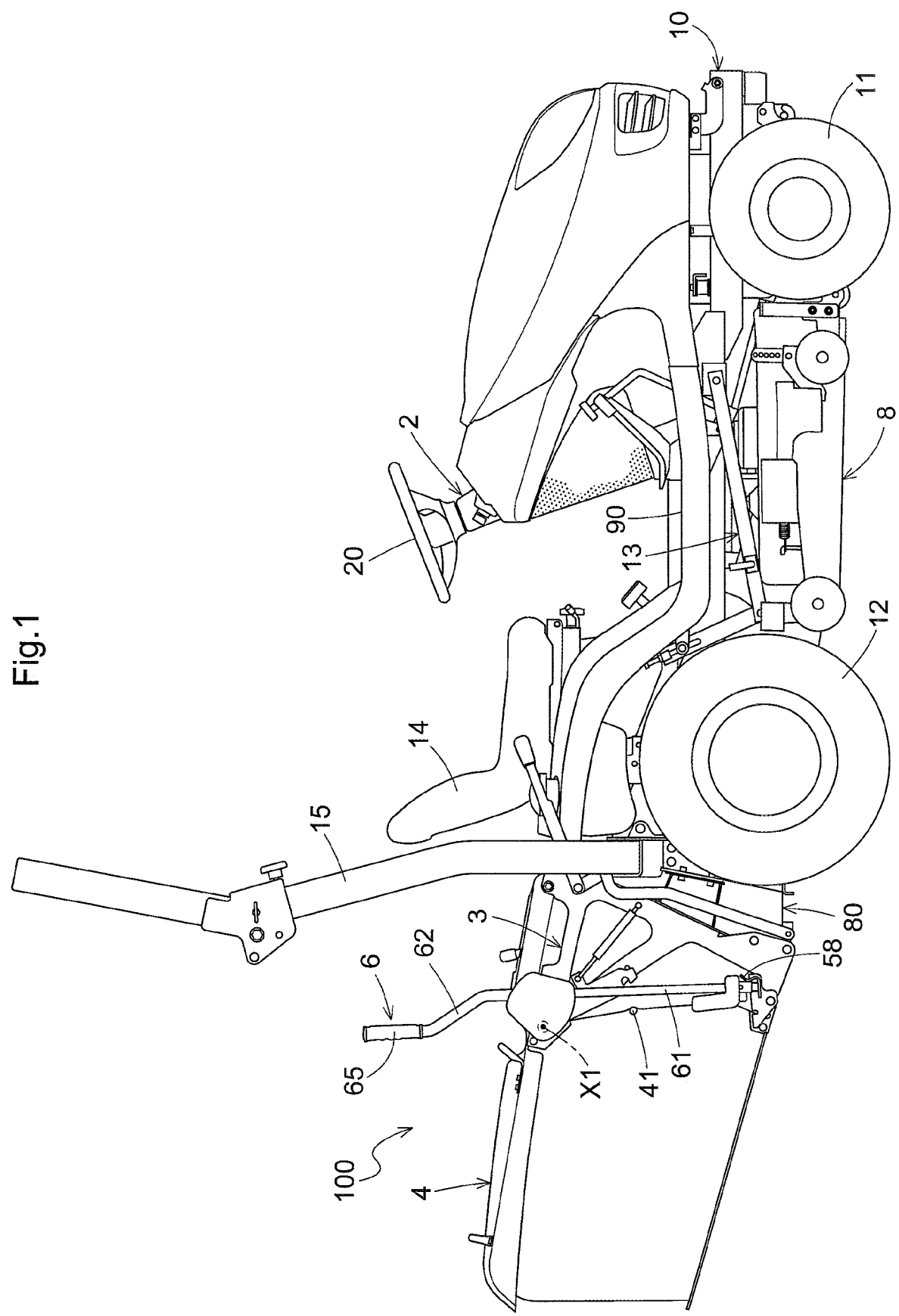
FIG. 1 is a side view of a grass mower.
Figure 2:
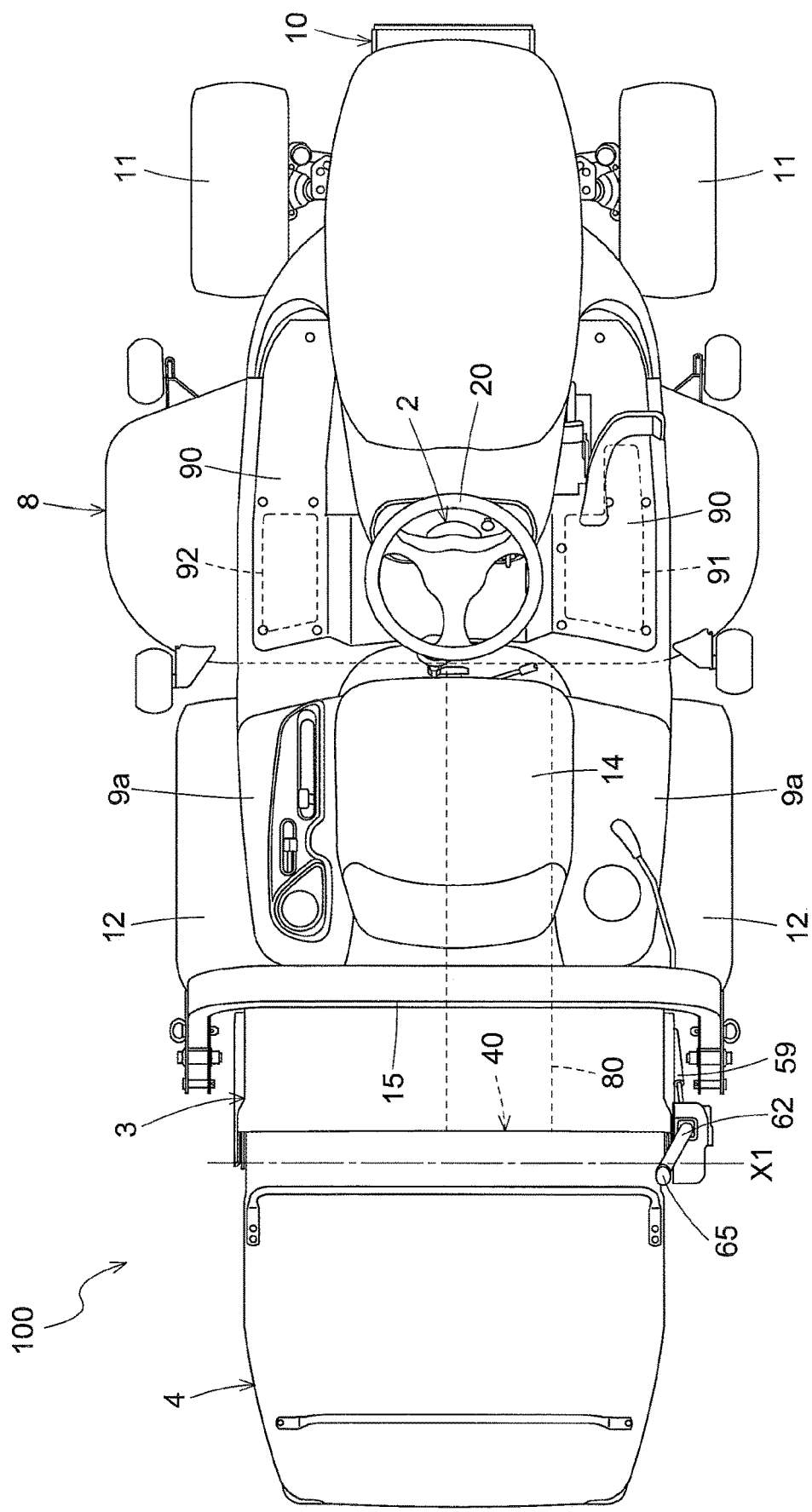
FIG. 2 is a plan view of the grass mower.

FIG. 1 shows an overall side view of the grass mower including a grass collecting device according to the present invention, and FIG. 2 is an overall plan view of the grass mower. This grass mower includes the traveling machine body 10 supported off the ground by the front wheels 11 serving as steerable wheels and the rear wheels 12 serving as driving wheels. A three-blade mower unit 8 is suspended from the lower portion of the traveling machine body 10 between the front wheels 11 and the rear wheels 12 via a link mechanism 13 so that it can be raised and lowered. A driver seat 14 is provided on the traveling machine body 10 above the rear wheels 12, and a ROPS 15 having a gate shape is further provided on the rear side of the driver seat 14. A handle post 2 that supports a steering wheel 20 is arranged on the front side of the driver seat 14.

A grass collecting device 100 includes a base frame 3 that is detachably fixed to the rear end of the traveling machine body 10, and a grass container 4 is supported by the base frame 3 so as to be capable of being swung in the vertical direction around a lateral axis X1 that is set on the upper portion of the base frame 3. The mower unit 8 and the grass container 4 are connected using a duct 80 that is provided under the traveling machine body 10 and extends in the front-rear direction of the machine body, passing between the rear wheels 12. Cut grass cut by the mower unit 8 is transported, using wind force, through this duct 80 to the grass container 4, and stored in the grass container 4 located at the cut grass storage position.

An opening 40 that receives a discharge portion of the duct 80 is formed in a front wall of the box-shaped grass container 4. When the grass container 4 is swung upward at substantially a right angle (i.e., located at the cut grass discharge position) such that the opening 40 faces downward, this opening 40 functions as a discharge port through which the cut grass stored in the grass container 4 is discharged.

Figure 3:
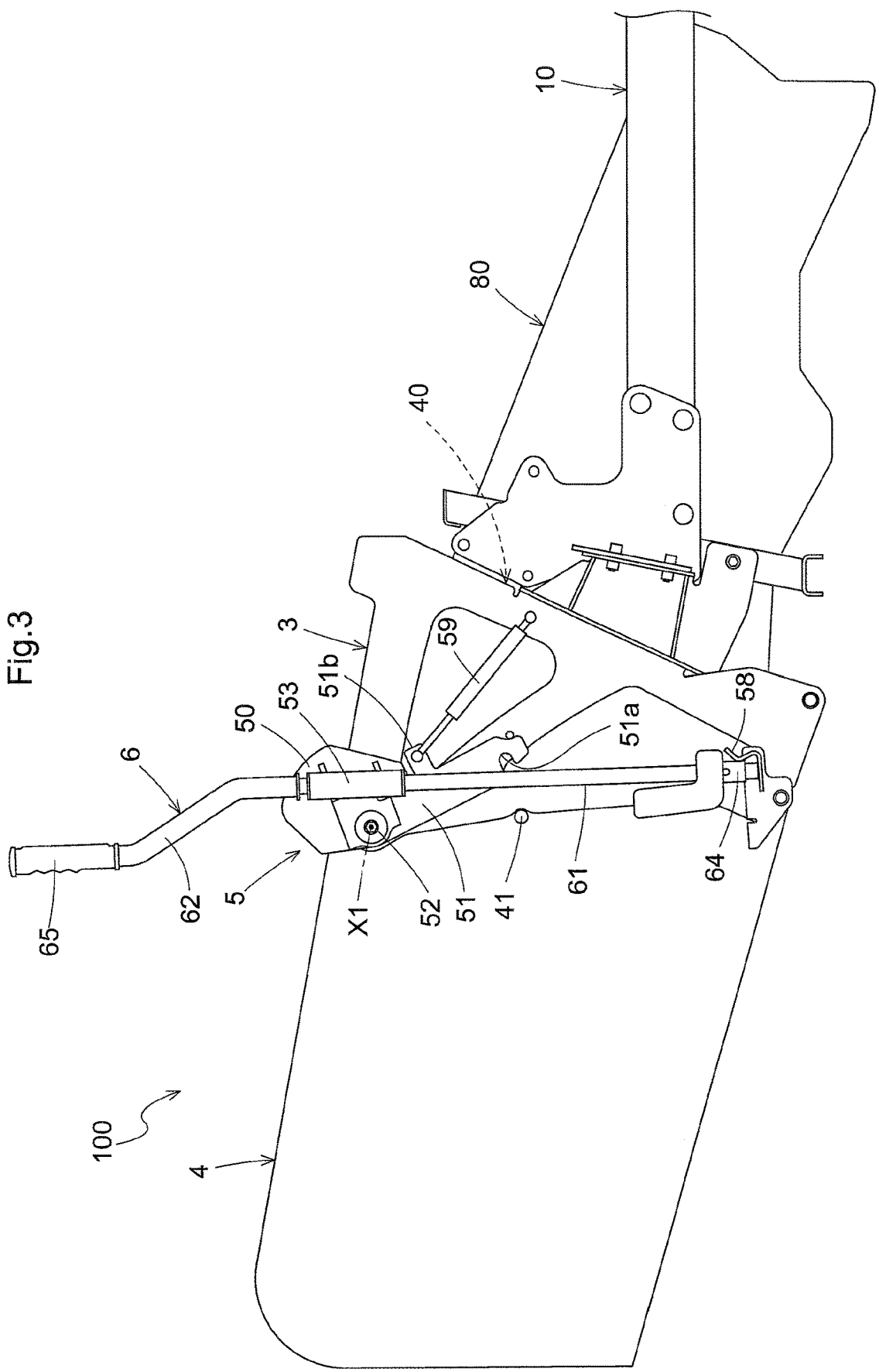
FIG. 3 is a side view of a grass collecting device in which a grass container is located at a cut grass storage position.

As specifically shown in FIG. 3, the base frame 3 is provided with the swing mechanism 5 and the rod lever unit 6 in order to manually swing the grass container between the cut grass storage position and the cut grass discharge position.

The swing mechanism 5 includes a swing plate 50 having an arm portion 51, a swing shaft 52 that supports the swing plate 50 such that the swing plate 50 can be swung around the lateral axis X1, and a sleeve 53 attached to the swing plate 50. A slit hole 51a for receiving an engaging pin 41 provided on a side wall of the grass container 4 during swinging in a clockwise direction in FIG. 3 is formed near the leading end of the arm portion 51. The engaging pin (engaging portion) 41 and the slit hole (engaged portion) 51a are engaged with each other such that the grass container 4 is interlocked with the swing plate 50 and swung while the swing plate 50 is being swung.

Figure 4:
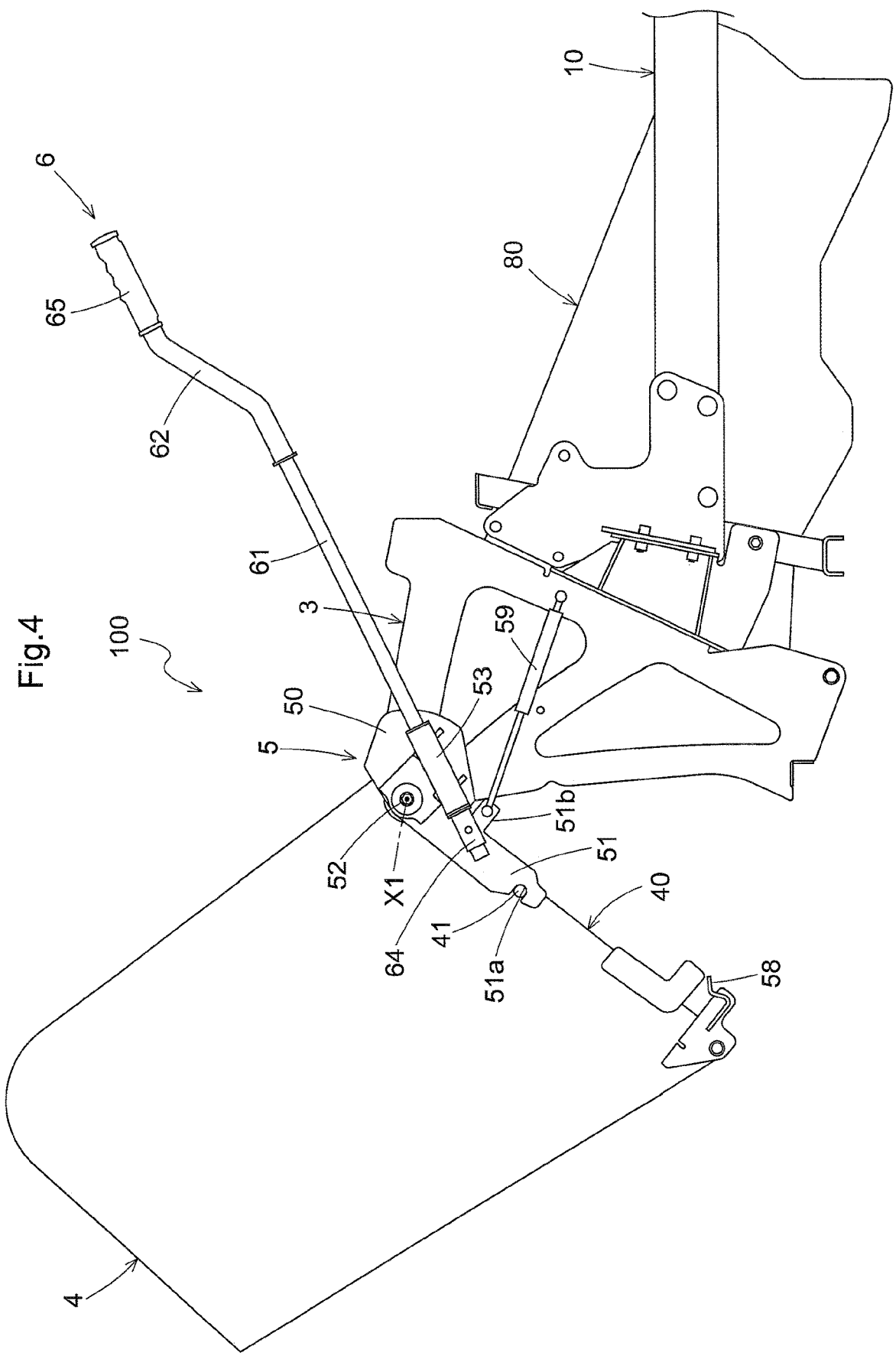
FIG. 4 is a side view of the grass collecting device in which the grass container is located at a cut grass discharge position.

The grass container 4 is swung between the cut grass storage position shown in FIG. 3 and the cut grass discharge position shown in FIG. 4. The swing mechanism 5 and the rod lever unit 6 are swung together around the lateral axis X1. The swing position in FIG. 3 is a first operation position, and the swing position in FIG. 4 is a second operation position. The engaging pin (engaging portion) 41 of the grass container 4 is engaged with the slit hole 51a of the swing plate 50 while the swing mechanism 5 and the rod lever unit 6 are swung from the first operation position to the second operation position. After that, the swing mechanism 5, the rod lever unit 6 and the grass container 4 are swung together around the lateral axis X1. A gas spring 59 is provided extending between a receiving portion 51b formed in the swing plate 50 and the base frame 3. The receiving portion 51b is formed between the lateral axis X1 and the slit hole 51a. The gas spring 59 functions as a biasing device for biasing the grass container 4 via the swing plate 50 in the direction toward the cut grass discharge position.

Figure 5:
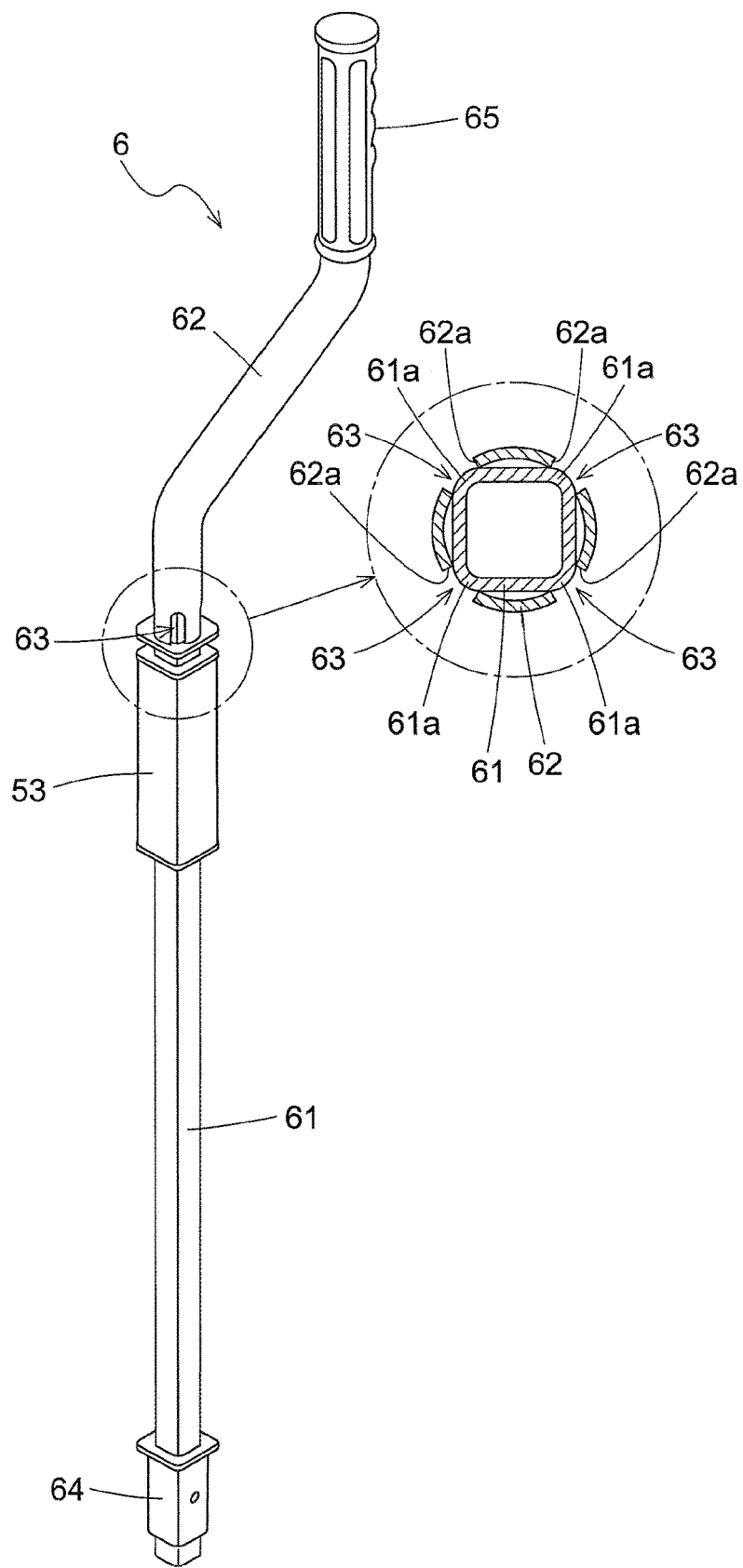
FIG. 5 is a perspective view of a rod lever unit.

As is clear from FIGS. 1, 2, and 5, the rod lever unit 6 includes a base rod 61 that has a rectangular cross section, a grip rod 62 that has a circular cross section that extends in a direction offset from an extending direction of the base rod 61, and a coupling portion 63 (FIG. 5) through which the base rod 61 and the grip rod 62 are coupled so as not to be capable of being rotated relative to each other. The base rod 61 is inserted into the sleeve 53 with a rectangular pipe shape that is fixed to the swing plate 50, and can be slid in the vertical direction. A bush 64 is inserted into the lower end of the base rod 61, and a receiving base 58 for holding this bush 64 is provided in the base frame 3. When the base rod 61 is slid to the lower position shown in FIG. 3, the bush 64 enters the receiving base 58, and the base rod 61 is thus prevented from being swung. The orientation of the rod lever unit 6 located at the first operation position is shown in FIG. 3, and, at this time, the grass container 4 is in a cut grass storage orientation. The orientation of the rod lever unit 6 located at the second operation position is shown in FIG. 4, and, at this time, the grass container 4 is in a cut grass discharge orientation.

As shown in FIG. 5, the base rod 61 has a linear shape, whereas the grip rod 62 is bent at its intermediate portion and is offset from the extending direction of the base rod 61, and the leading end extends parallel with the extending direction of the base rod 61 again. This leading end is sheathed with a grip 65. As can be appreciated from FIG. 2, clearance between the grip rod 62 and the ROPS 15 is sufficiently secured due to this offset while the rod lever unit 6 is being swung from the first operation position to the second operation position. The grip 65 is provided on the upper portion of the grip rod 62.

The base rod 61 is a rectangular pipe that has a rectangular cross section, and the grip rod 62 is a round pipe that has a circular cross section. The coupling portion 63 through which the upper end of the base rod 61 and the lower end of the grip rod 62 are coupled is formed as a coupling structure that has a geometrical shape, in which four corners 61a of the base rod 61 are inserted from the lower end of the grip rod 62 into four vertical slits 62a provided at intervals of 90 degrees. Although a large amount of torque around the central axis of the base rod 61 is generated in the coupling portion 63 due to the offset shape of the grip rod 62, this coupling structure having a geometrical shape reliably prevents the base rod 61 and the grip rod 62 from being rotated relative to each other. Moreover, the offset shape of the grip rod 62 enables a driver seated on the driver seat 14 to operate the rod lever unit 6 in as comfortable a posture as possible.

Figure 6:
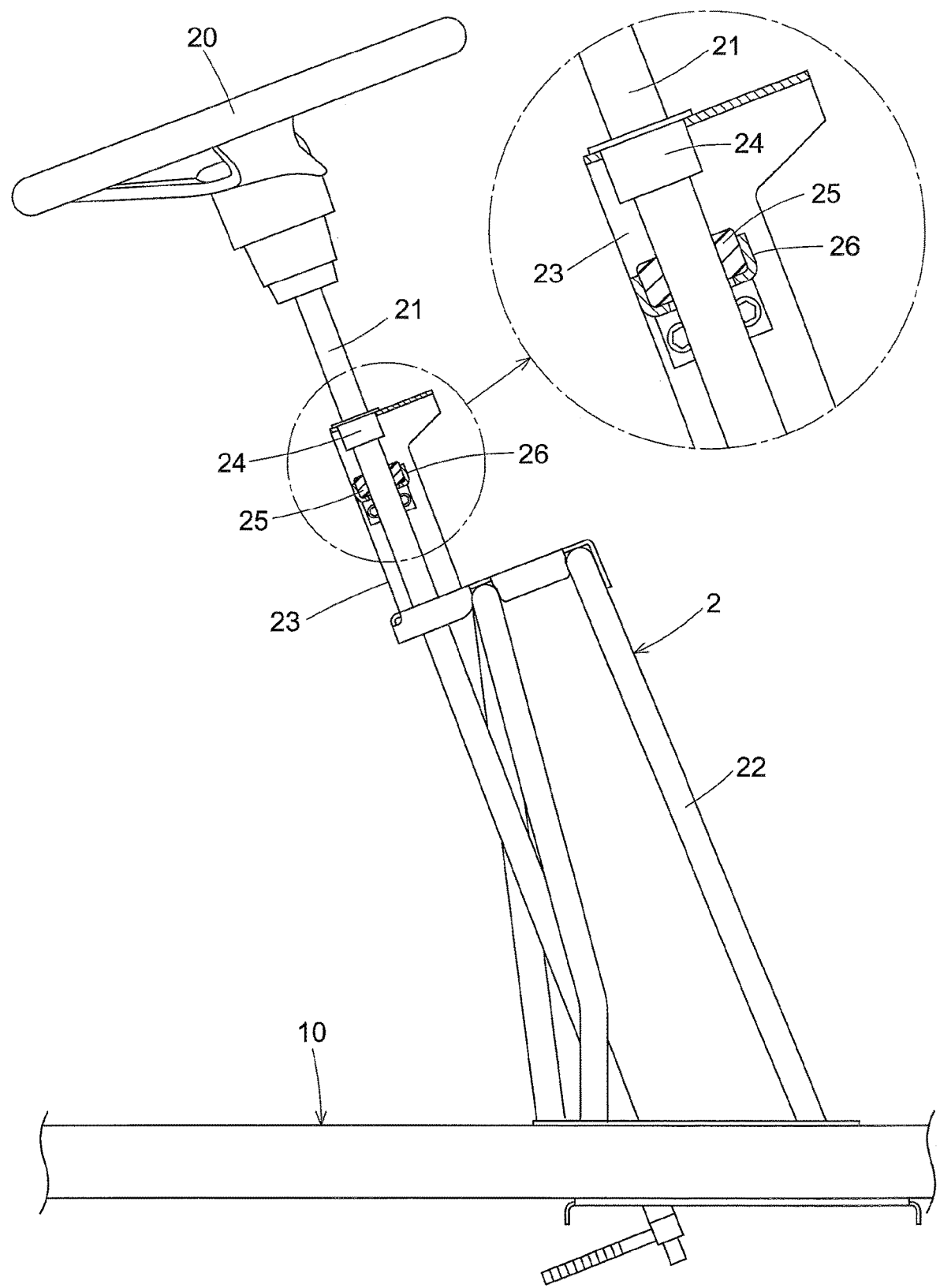
FIG. 6 is a side view of a handle post that supports a steering wheel.
Figure 7:
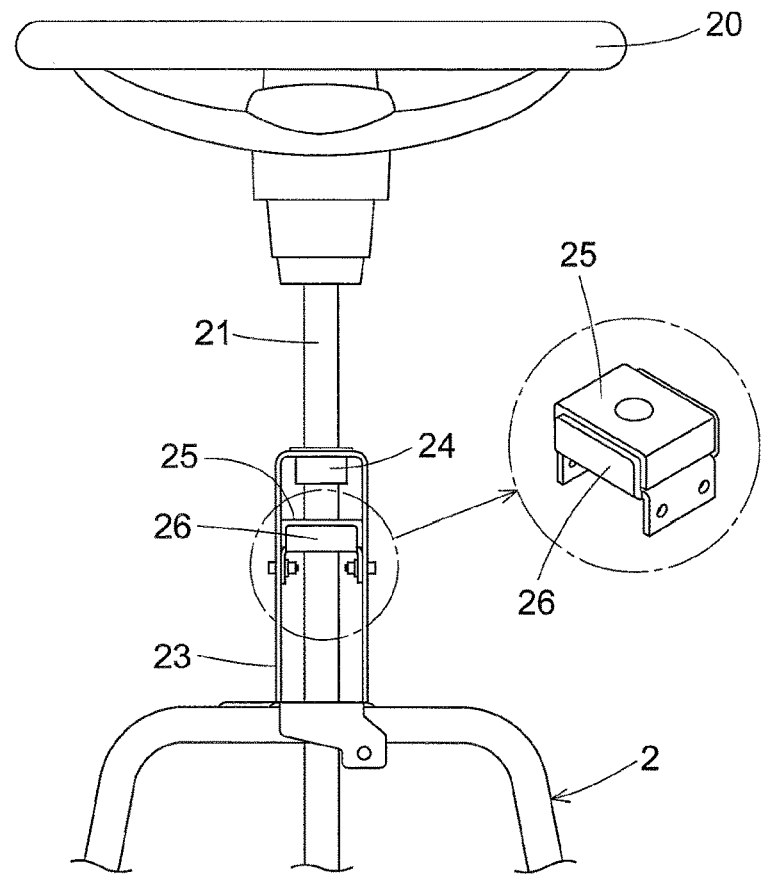
FIG. 7 is a front view of the handle post that supports the steering wheel.

FIGS. 6 and 7 show a handle post 2. The handle post 2 includes a steering shaft 21, a support 22, and a supporting base 23. The supporting base 23 is provided upright on a frame structure included in the traveling machine body 10. The supporting base 23 having a gate shape is provided on the upper portion of the frame structure. A bush 24 is attached to the top panel of the supporting base 23, and the steering shaft 21 is inserted into this bush 24. The upper end of the steering shaft 21 is coupled to the steering wheel 20, and the lower end of the steering shaft 21 is coupled to a steering mechanism (not shown) for steering the front wheels 11.

As shown in a partially enlarged view in FIG. 6, a bracket 26 having a legged channel shape through which the steering shaft 21 passes is provided inside the supporting base 23. The bracket 26 is attached to the side panel of the supporting base 23 via its legs such that the channel faces upward. An isolator 25 made of rubber is attached to the channel of the supporting base 23. A hole is formed at the center of the isolator 25, and the steering shaft 21 passes through this hole. The steering shaft 21 is in intimate contact with the inner surface of the hole. This isolator 25 absorbs vibrations propagated from the frame structure of the traveling machine body 10 to the steering shaft 21, and therefore, vibrations felt by a driver via the steering wheel 20 is reduced.

Figure 8:
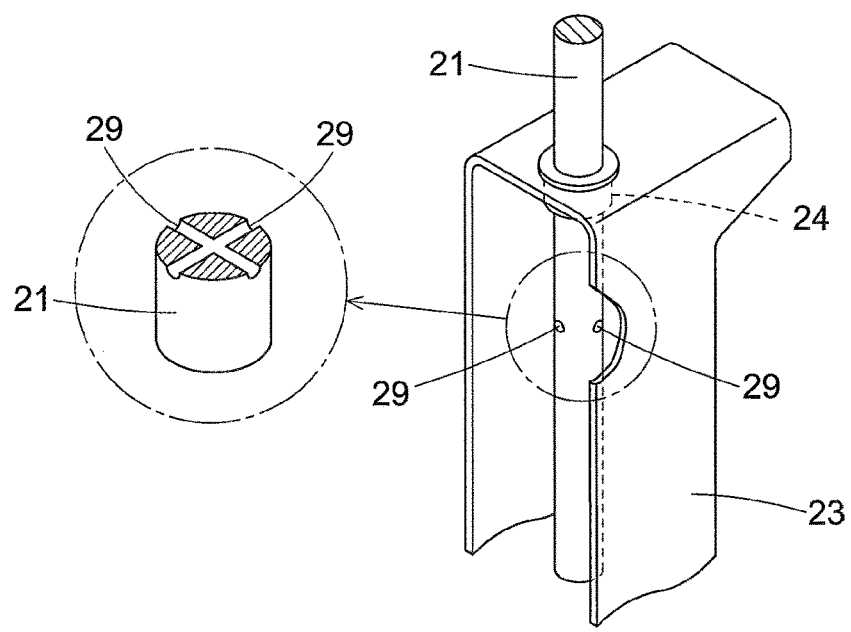
FIG. 8 is a perspective view showing holes for reducing vibration that are formed in a steering shaft.

FIG. 8 shows another measure for reducing vibrations that can be taken instead of or in addition to reducing vibrations using the isolator 25 shown in FIGS. 6 and 7. Here, vibrations propagated in the steering shaft 21 are reduced by suppressing a resonance phenomenon in the steering shaft 21. Specifically, a resonance frequency of the steering shaft 21 is adjusted by forming holes in the steering shaft 21, and resonance of the steering shaft 21 caused by vibrations propagated in the steering shaft 21 is thus reduced. As a result, vibrations propagated from the frame structure of the traveling machine body 10 to the steering shaft 21 are absorbed, and therefore, vibrations felt by a driver via the steering wheel 20 is reduced. In the embodiment shown in FIG. 8, two through holes 29 that extend in radial directions and are orthogonal to each other are provided in order to adjust a resonance frequency of the steering shaft 21. The number, the size, and the like of the through holes 29 are selected such that resonance of the steering shaft 21 caused by vibrations propagated in the steering shaft 21 is suppressed as much as possible. Bottomed holes that do not penetrate the steering shaft 21 may be formed instead of the through holes 29.

Figure 9:
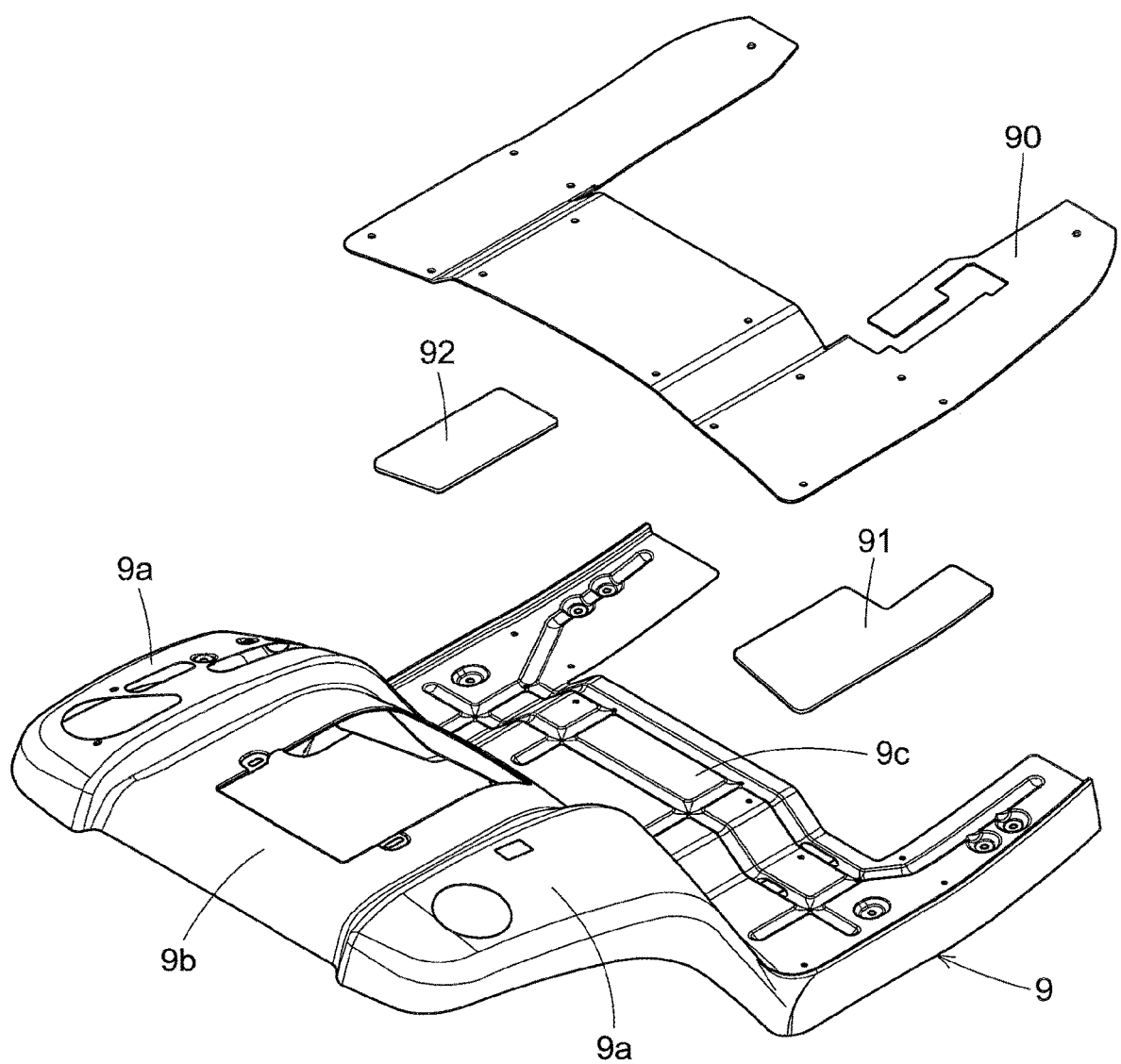
FIG. 9 is a perspective view of a floor deck plate.

FIG. 9 shows a floor deck plate 9 included in the traveling machine body 10. This floor deck plate includes left and right fender portions 9a, a driver seat attachment portion 9b, and a floor plate portion 9c. The floor plate portion 9c is used as a step and a footrest for a driver, and thus provided with a non-slip sheet 90. Furthermore, in this embodiment, high vibration absorbing sheets 91 and 92 are provided between the floor plate portion 9c and the non-slip sheet 90 at positions corresponding to regions to be used as footrests by a driver. High vibration absorbing materials are flexible and have poor durability, and therefore, using the high vibration absorbing materials for the non-slip sheet 90 results in an insufficient non-slip effect, low durability, and an increase in cost. Accordingly, it is preferable that a material such as PVC that has high durability is used for the non-slip sheet 90, and roughness or the like for exhibiting a non-slip effect is formed on the surface. In this embodiment, the high vibration absorbing sheets 91 and 92 are provided in only the regions to be used as footrests by a driver, thus realizing a floor having a surface that provides an excellent non-slip effect and durability and footrest regions that has a high cushioning effect and in which vibration is less likely to be propagated.

It should be noted that the configurations disclosed in the above-described embodiment can be used in combination with configurations disclosed in other embodiments as long as they are compatible with each other. The embodiment disclosed in this specification is illustrative, and embodiments of the present invention are not limited thereto and can be modified as appropriate without departing from the object of the present invention.

Although, in the above-described embodiment, the mid-mount mower in which the mower unit 8 is arranged between the front wheels 11 and the real wheels 12 is described, the present invention can be applied to a front mower in which the mower unit 8 is arranged on the front side of the front wheels 11. Moreover, although, in the above-described embodiment, the duct 80 is configured to pass between the rear wheels 12 under the traveling machine body 10, the duct 80 may be configured to make a detour on the lateral side of the traveling machine body 10. Furthermore, an internal combustion engine or an electric motor to which electricity is supplied from a battery may be used as a power source of the grass mower.

The invention claimed is:

1. A grass mower comprising:
    a traveling machine body;
    a driver seat provided on the traveling machine body;
    a mower unit provided on the traveling machine body;
    a grass container provided on a rear portion of the traveling machine body for storing cut grass from the mower unit;
    a rod lever unit capable of undergoing displacement between a first operation position and a second operation position; and
    a swing plate for swinging the grass container between a cut grass storage position and a cut grass discharge position by utilizing operational displacement of the rod lever unit,
    the rod lever unit including a base rod coupled to the swing plate, a grip rod extending in a direction offset from an extending direction of the base rod, and a coupling through which the base rod and the grip rod are coupled so as not to be capable of being rotated relative to each other, wherein the grip rod has a circular cross section, the base rod has a rectangular cross section, and the coupling is shaped to allow the base rod to be inserted into the grip rod.

2. The grass mower according to claim 1,
wherein the grass container is supported by a base frame that is attachable to and detachable from the traveling machine body, on a rear side of the base frame.

3. The grass mower according to claim 1,
further comprising a swing mechanism including the swing plate to be swung around a swing axis of the grass container, a sleeve fixed to the swing plate for slidably receiving the base rod, and a slit hole that is fixed to the swing plate and is engaged with an engaging pin of the grass container due to operational displacement of the rod lever unit.

4. The grass mower according to claim 1,
wherein the rod lever unit can be operated by a driver seated on the driver seat.

5. The grass mower according to claim 1,
wherein a gas spring is provided that biases the grass container in a direction toward the cut grass discharge position via the swing plate.

6. A grass mower comprising:
a traveling machine body;
a driver seat provided on the traveling machine body;
a mower unit provided on the traveling machine body;
a grass container provided on a rear portion of the traveling machine body for storing cut grass from the mower unit;
a rod lever unit capable of undergoing displacement between a first operation position and a second operation position; and
a swing plate for swinging the grass container between a cut grass storage position and a cut grass discharge position by utilizing operational displacement of the rod lever unit, the rod lever unit including a base rod coupled to the swing plate, a grip rod formed separately from the base rod and extending in a direction offset from an extending direction of the base rod, and a coupling through which the base rod and the grip rod are coupled so as not to be capable of being rotated relative to each other, wherein the grip rod has a circular cross section, the base rod has a rectangular cross section, and the coupling is shaped to allow the base rod to be inserted into the grip rod.

7. The grass mower according to claim 6,
wherein the grass container is supported by a base frame that is attachable to and detachable from the traveling machine body, on a rear side of the base frame.

8. The grass mower according to claim 6,
further comprising a swing mechanism including the swing plate to be swung around a swing axis of the grass container, a sleeve fixed to the swing plate for slidably receiving the base rod, and a slit hole that is fixed to the swing plate and is engaged with an engaging pin of the grass container due to operational displacement of the rod lever unit.

9. The grass mower according to claim 6,
wherein the rod lever unit can be operated by a driver seated on the driver seat.

10. The grass mower according to claim 6,
wherein a gas spring is provided that biases the grass container in a direction toward the cut grass discharge position via the swing plate.

* * * * *